United States Patent [19]
Mazzoni et al.

[11] 3,990,431
[45] Nov. 9, 1976

[54] SOLAR HEAT COLLECTOR HAVING A VAPOR BARRIER SEAL AND METHOD OF MAKING SAME

[75] Inventors: Renato J. Mazzoni, Tarentum; Lester F. Schutrum, New Kensington, both of Pa.

[73] Assignee: PPG Industries, Inc., Pittsburgh, Pa.

[22] Filed: June 25, 1975

[21] Appl. No.: 590,007

[52] U.S. Cl.................................. 126/271; 52/172
[51] Int. Cl.² ........................................ F24J 3/02
[58] Field of Search .............. 126/270, 271; 52/172

[56] References Cited
UNITED STATES PATENTS

| | | | |
|---|---|---|---|
| 1,250,260 | 12/1917 | Wilcox............................... | 126/271 |
| 3,771,276 | 11/1973 | Stewart et al.......................... | 52/172 |
| 3,775,914 | 12/1973 | Patil...................................... | 52/172 |

FOREIGN PATENTS OR APPLICATIONS

| | | | |
|---|---|---|---|
| 952,376 | 8/1974 | Canada................................ | 52/172 |
| 938,012 | 9/1963 | United Kingdom................. | 126/271 |

*Primary Examiner*—Kenneth W. Sprague
*Assistant Examiner*—James C. Yeung
*Attorney, Agent, or Firm*—Donald Carl Lepiane

[57] ABSTRACT

A solar heat collector of the type having a pair of tempered glass sheets mounted in spaced relation to each other and to a solar energy and infrared absorber is provided with a vapor-impervious and moisture-impervious seal. The seal includes (1) a moisture-impervious adhesive to prevent moisture from moving between the glass sheets and absorber and (2) a vapor-impervious strip, e.g., an aluminum strip mounted between the adhesive and peripheral edge portions of the glass sheets and absorber to prevent solvent vapors of the adhesive from moving between the glass sheets and absorber.

31 Claims, 8 Drawing Figures

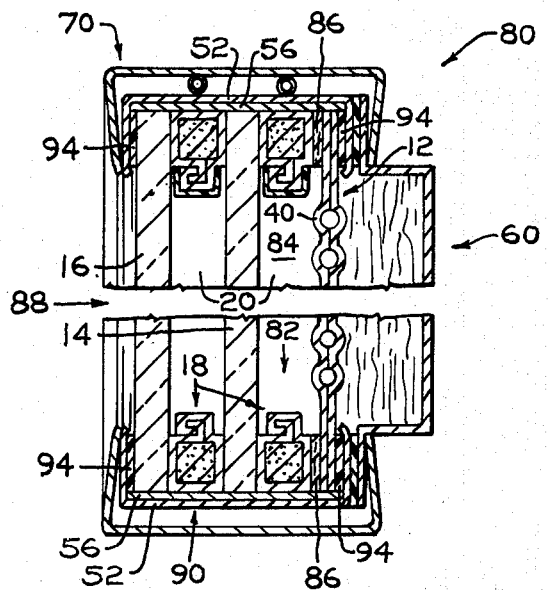
FIG. 5
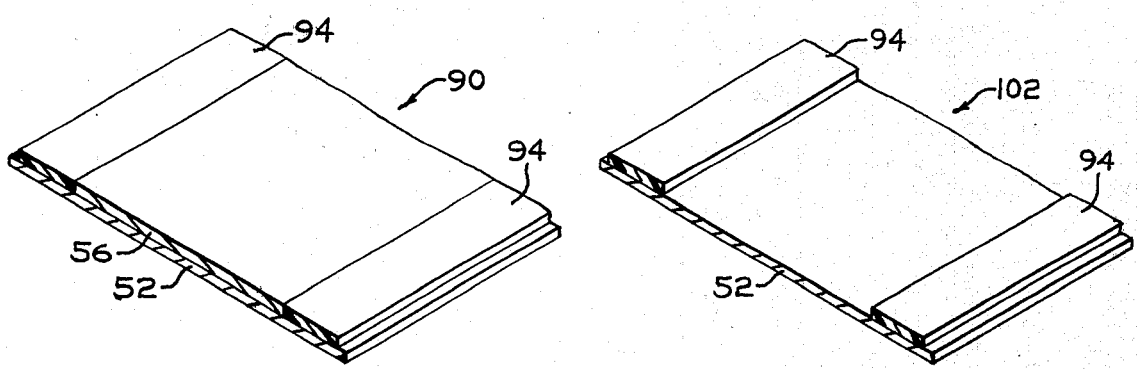
FIG. 6
FIG. 8
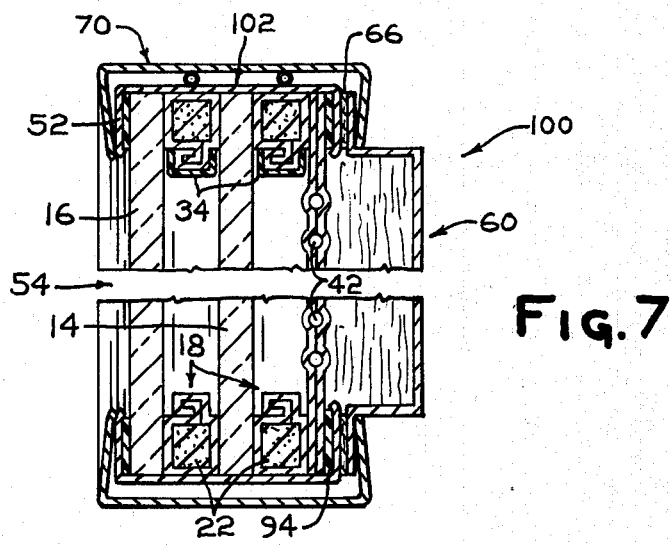
FIG. 7

SOLAR HEAT COLLECTOR HAVING A VAPOR BARRIER SEAL AND METHOD OF MAKING SAME

RELATED U.S. PATENT APPLICATIONS

The breather tube taught in U.S. Pat. application Ser. No. 550,680 filed Feb. 18, 1975, in the names of Renato J. Mazzoni and Lester F. Schutrum and entitled "Solar Heat Collector Having a Breather Tube" may be used in the practice of the invention and the teachings therein are hereby incorporated by reference.

BACKGROUND OF THE INVENTION

1. Field of the Invention

This invention relates to a solar heat collector having a vapor-impervious and moisture-impervious seal and the method of making same.

2. Discussion of the Technical Problems

The advantages of using solar heat collectors to collect solar energy for heating a fluid and/or for generating electric power have been recognized in the prior art.

In U.S. Pat. application Ser. No. 450,703 filed on Mar. 13, 1974, in the name of Pandit G. Patil and entitled "Solar Heat Collector" there is disclosed a solar heat collector having an outer cover plate, an intermediate cover plate and a solar energy and infrared absorber mounted in spaced relation to each other by spacer assemblies. Each of the spacer assemblies (1) maintains the cover plates and absorber in spaced relation to provide airspaces therebetween; (2) removes moisture from the airspaces and (3) prevents moisture from entering the airspaces.

Although the solar heat collector disclosed in the above-mentioned U.S. Pat. Application is ideally suitable for collecting solar radiation for subsequent use, the solar heat collector has limitations. For example, the spacer assembly preferably includes a moisture-impervious adhesive that prevents the moisture from entering the airspace. The moisture-impervious adhesives normally used in the art contain volatiles which are driven off at elevated temperatures, e.g., above 180° F. (88° C.).

During use of the solar heat collector, the collector is heated by solar radiation to temperatures of greater than about 200° F. (93° C.). At this temperature and above volatiles normally used in moisture-impervious adhesives are driven off and enter the airspaces. These volatiles have been found to condense on the cover plates and act as a barrier to solar radiation thereby reducing the efficiency of the solar heat collector.

In U.S. Pat. application Ser. No. 550,679 filed on Feb. 18, 1975, in the names of George H. Bowser, Renato J. Mazzoni and Lester F. Schutrum and entitled "Method of Fabricating a Solar Heat Collector" there is taught the step of heating the moisture-impervious adhesive prior to applying it to the peripheral edge portions of the solar collector. The adhesive is heated to a temperature higher than the expected temperature attained by the collector during use to drive out the volatiles in the adhesive.

It would be advantageous if other methods and solar collector designs were available that prevented or minimized the movement of the volatiles in the moisture-impervious adhesive into the compartments between the cover plates and absorber.

SUMMARY OF THE INVENTION

This invention relates to an improved method of fabricating a solar heat collector. The method to which this is an improvement includes the steps of providing a solar energy and infrared absorber plate and at least one cover plate capable of passing solar energy. The absorber plate and cover plate are mounted in spaced relation to provide a solar heat collector subassembly having an airspace between the cover plate and the absorber plate. The improvement includes the steps of providing a vapor-impervious barrier around the peripheral edge portions of the heat collector subassembly and a moisture-impervious seal about the vapor-impervious barrier and the collector subassembly to prevent moisture from moving into the airspace. The moisture-impervious seal includes a moisture-impervious barrier prevents or minimizes the movement of the volatiles into the airspace.

This invention also relates to an improved solar collector of the type having a spacer frame mounted between a cover plate capable of passing solar energy, e.g., a glass plate and a solar energy and infrared absorber plate to provide an airspace therebetween. Facilities are provided for absorbing moisture in the airspace. The improvement includes a moisture-impervious seal around the peripheral edge portions of the collector and the outer marginal edge portions of the collector. The moisture-impervious seal includes a moisture-impervious adhesive having volatiles therein. A vapor-impervious barrier is provided between the moisture-impervious seal and the peripheral edge portions of the collector to prevent or minimize the movement of the volatiles into the airspace.

BRIEF DESCRIPTION OF THE DRAWING

FIGS. 4, 6 and 8 are isometric fragmented views of various embodiments of moisture-impervious and vapor-impervious composite strips incorporating features of the invention; and FIGS. 5 and 7 are fragmented views of solar heat collectors similar to FIG. 2 showing different embodiments of solar heat collectors constructed in accordance to the teachings of the invention.

DESCRIPTION OF THE INVENTION

In the following discussion, like numerals refer to like elements.

Figure 1:
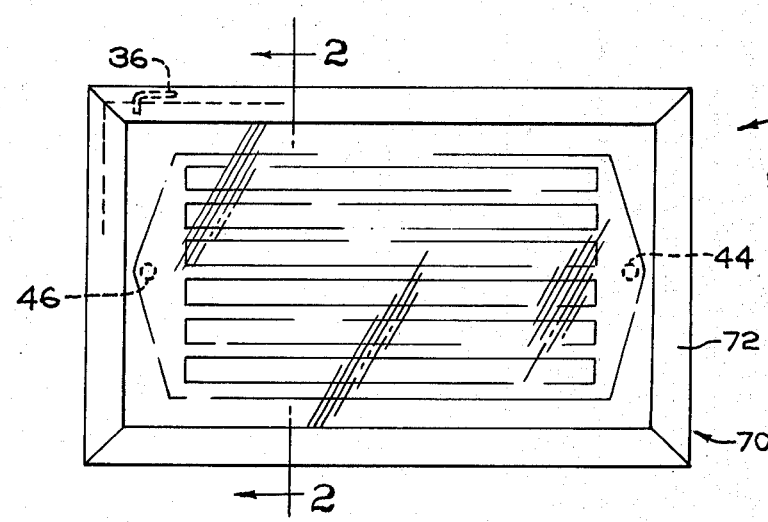
FIG. 1 is a plan view of a solar heat collector incorporating features of the invention.

Referring to FIG. 1, there is shown a solar heat collector 10 that may be used in the practice of the invention. As will become apparent, the invention is not limited thereto and may be practiced on any type of solar heat collector. In general, and with reference to FIGS. 1 and 2, the solar heat collector 10 includes a solar radiation and infrared absorber plate 12, an intermediate cover plate 14 and an outer cover plate 16.

The absorber plate 12, the intermediate cover plate 14 and outer cover plate 16 are held in spaced relation by two spacer frames 18 (one shown in FIG. 3) to (1) maintain the cover plates and absorber plate in spaced relation to provide dead airspaces or compartments 20 therebetween; and (2) absorb moisture trapped in the airspaces 20 during fabrication of the collector. Preferably the spacer frame 18 also provides for the equalization of air pressure in the airspaces 20 to the ambient air pressure.

Figure 3:
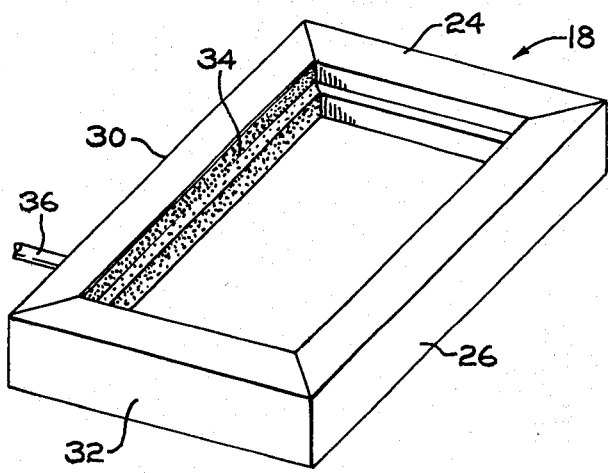
FIG. 3 is an isometric view of a spacer frame that may be used in the practice of the invention.
Figure 2:
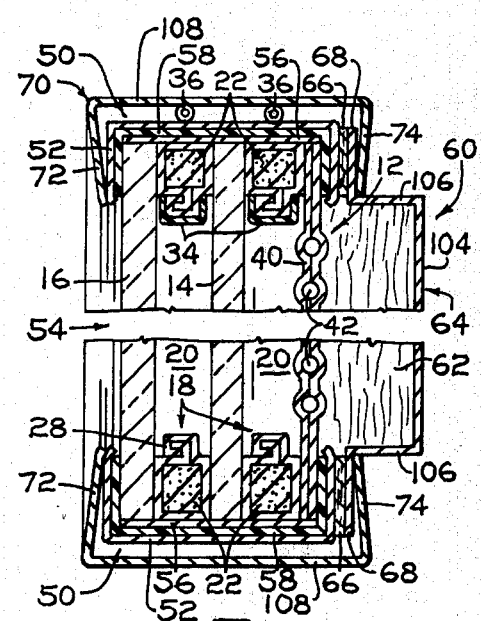
FIG. 2 is a fragmented view taken along lines 2—2 of FIG. 1.

Although not limiting to the invention and with reference to FIGS. 2 and 3, each of the spacer frames 18 preferably are of the type disclosed in U.S. Pat. Application Ser. No. 550,680 filed Feb. 18, 1975, in the names of Renato J. Mazzoni and Lester F. Schutrum and entitled "Solar Heat Collector Having a Breather Tube" which teachings are hereby incorporated by reference. The spacer frame 18 has a desiccant material 22 therein such as silica gel or molecular sieve. A portion of the spacer frame, e.g., sections 24 and 26 shown in FIG. 3, is provided with passageways 28 to provide communication between the airspace 20 and the desiccant material 22 to absorb moisture from the airspaces. The remaining portion of the spacer frame, e.g., sections 30 and 32 has the passageways 28 sealed as by a layer of paint 34 and is provided with a capillary tube 36 on the outer peripheral surface of the spacer frame. In this manner, the pressure in the airspaces 20 can be equalized with the ambient air pressure while preventing moisture from moving into the airspaces.

The solar radiation and infrared absorber plate 12 may be any of the types used in the solar collector art. In general, the absorber plate 12 is made of a heat conductive material such as aluminum, steel or copper. Surface 40 of the absorber plate facing the sun is normally treated to provide maximum efficiency in absorbing solar radiation for subsequent use. For example, the solar energy and/or infrared energy may be absorbed to heat a heat absorbing medium moving through conduits 42 provided in the absorber plate 12. The heat absorbing medium, e.g., water or a mixture of water and ethylene glycol is moved into inlet pipe 44 through the conduits 42 and out of the conduit by way of outlet pipe 46 (see FIG. 1).

The intermediate and outer cover plates 14 and 16, respectively, are selected to pass solar radiation to the absorber plate while reducing heat loss from the absorber plate due to convection and/or conduction. Normally, the cover plates are made of glass that may be thermally or chemically tempered. Further, if desired, one or both of the glass plates may be selectively coated as taught in U.S. Pat. application Ser. No. 450,702 filed on Mar. 13, 1974, in the name of Frank H. Gillery and entitled "Solar Heat Collector".

A vapor-impervious and moisture-impervious composite strip 50 (see also FIG. 4) incorporating features of the invention is mounted on the peripheral edge portions of the glass sheets, spacer frames and absorber plate and on the marginal edge portions of the outer glass sheet 16 and absorber plate 12.

Figure 4:
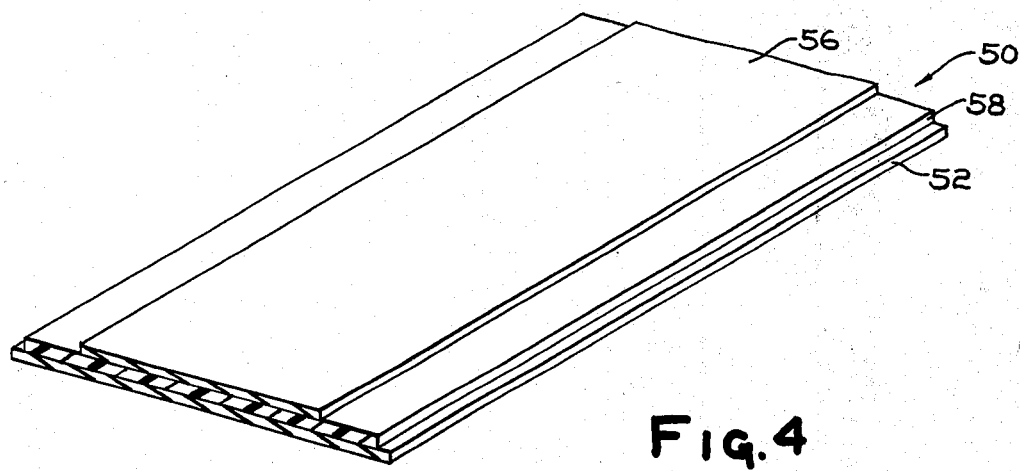

With reference to FIG. 4, the composite strip 50 includes an outer tape 52 and an inner tape 56 mounted about a layer 58 of moisture-impervious adhesive. The outer tape 52 is made of bendable formable, moisture-impervious material, e.g., steel or aluminum. The tape has a width sufficient to completely extend from the marginal edge portions of the outer glass sheet 16 to the outer marginal edge portions of the absorber plate 12. The length of the tape is sufficient to encompass the perimeter of the glass sheets, spacer frames and absorber plate, i.e., solar collector subassembly 54 with ends of the tape 52 overlapping.

The inner tape 56 is made of a bendable formable, vapor-impervious material, e.g., steel, aluminum or synthetic resin polymers sold under the trademark TEFLON. The width of the inner tape 56 is sufficient to cover the peripheral edge portions of the solar collector subassembly. "Vapor-impervious material" as the term is used is any material that prevents vapors from moving therethrough into the airspaces. The inner tape 56 has a length approximately equal to the length of the outer tape 52.

The layer 58 of the moisture-impervious adhesive may be any of the types used in the solar collector art, for example, the types taught in U.S. Pat. application Ser. No. 550,679 filed on Feb. 18, 1975, in the names of George H. Bowser, Renato J. Mazzoni and Lester F. Schutrum and entitled "Method of Fabricating a Solar Heat Collector" which teachings are hereby incorporated by reference.

"Moisture-impervious adhesive" as the term is used is adhesive that prevents moisture from moving into the airspaces while adhesively bonding the composite strip to the outer marginal edges of the outer cover plate 16 and the absorber plate 12.

The width of the adhesive layer 58 is preferably less than the outer tape 52 and greater than the inner tape 56 so that the strip may be adhered to the marginal edge portions of the outer glass sheet and absorber plate and will not extend beyond the outer tape 52 when flowed which gives an unsightly appearance. The length of the adhesive layer 58 is approximately equal to the length of the outer tape 52.

At the present time, the moisture-impervious adhesives normally used are elastomeric sealants containing butyl rubber, polyisobutylene and polybutene. During use of the solar heat collector, the absorber, as it is heated, heats the cover plates and spacer frames by radiation. In certain instances, i.e., on a warm, sunny day, the solar heat collectors have been found to reach a temperature of about 300° F. (160° C.). Normally at temperatures above about 180° F. (88° C.) the volatiles in the available moisture-impervious adhesives are driven out and condense on the cover plates. When this occurs, the efficiency of the solar heat collector window is reduced because the volatiles on the cover plates act as a barrier to solar radiation. The volatiles driven out of the adhesives are believed to be low molecular weight polyisobutylene and polybutenes.

In the above-mentioned U.S. Pat. application Ser. No. 550,679, there is taught a heating step to remove the volatiles prior to its use. Although the heating minimizes or eliminates the volatiles from the adhesive, it would be advantageous to have another method to prevent volatiles from moving into the airspaces.

The composite strip 50 of the invention functions in the following manner. During use, the absorber plate is heated by solar radiation and infrared energy and the composite strip 50 is heated by convection and conduction. The volatiles driven out of the adhesive layer 58 are prevented from moving into the airspaces by the vapor-impervious tape 56 and the volatiles move into the atmosphere from the edges of the composite strip 50 on the marginal edges of the outer glass sheet and absorber plate. In this manner, the movement of the volatiles of the adhesive into the airspaces is prevented or minimized.

Although not limiting to the invention but recommended to reduce heat loss of the absorber plate by convection, there is shown in FIG. 2 an insulating compartment 60. The insulating compartment 60 includes thermal-insulating material 62 held against the outer surface of the absorber plate by a pan-shaped member 64 made of wood or metal, e.g., steel. A layer 66 of thermal-insulating material, e.g., asbestos is provided between flanges 68 of the pan 64 and the composite strip 50 on the marginal edge portions of the absorber plate to reduce edge heat losses of the absorber plate.

A channel member 70 of essentially U-shaped cross-section extends completely around the perimeter of the solar collector with its outer leg 72 engaging the marginal edges of the outer glass sheet 16 and outer leg 74 engaging the flange 68 of the pan-shaped member 64. The channel member 70 protects the edges of the cover plates and provides structural stability to the collector by urging (1) the pan-shaped member toward the absorber plate and (2) the glass sheets and absorber plate toward each other about the spacer frames 18.

The thermal-insulating compartment 60 is of the type taught in U.S. Pat. application Ser. No. 550,507 filed on Feb. 18, 1975, in the name of Pandit G. Patil and entitled "Solar Heat Collector Unit" which teachings are hereby incorporated by reference.

Referring now to FIGS. 5 and 6, the discussion will be directed to another embodiment of the invention. Solar collector 80 includes the outer cover plate 16 and intermediate cover plate 14 which are separated by the spacer frame 18 to provide the airspace 20 therebetween. The intermediate cover plate 14 and the absorber 12 are separated by a spacer assembly 82 to provide airspace 84 therebetween.

The spacer assembly 82 includes the spacer frame 18 and a layer 86 of thermal-insulating material between the spacer frame 18 and absorber plate to minimize edge heat loss in a manner taught in U.S. Pat. application Ser. No. 550,681 filed on Feb. 18, 1975, in the name of Pandit G. Patil and entitled "Solar Collector Having Minimum Edge Heat Loss" which teachings are hereby incorporated by reference.

For ease of discussion the glass sheets, spacer frame, spacer assembly and absorber plate are referred to as the solar heat collector subassembly 88. Mounted about the peripheral edge portions and marginal edge portions of the collector subassembly 88 is a composite strip 90 incorporating features of the invention.

The composite strip 90 as shown in FIG. 6 includes the vapor-impervious tape 56 held to the moisture-impervious tape 52 by beads 94 of a moisture-impervious adhesive as shown in FIG. 6. As can be appreciated, the moisture-impervious tape 52 and vapor-impervious tape 92 may be made of a monolithic tape having an inverted T-shaped configuration.

In practice the edges of the vapor-impervious tape 92 prevent or minimize the movement of vapor from the adhesive beads 94 toward the compartments 20 and 84 so that the vapors from the adhesive beads are exhausted to the atmosphere.

The thermal insulating compartment 60 and channel member 70 are mounted to the solar collector subassembly 88 as previously discussed.

Referring now to FIGS. 7 and 8, the discussion will be directed to another embodiment of the invention. Solar collector 100 shown in FIG. 7 includes the solar collector subassembly 54 of FIG. 1 having a composite strip 102 shown in FIG. 4 about the peripheral and marginal edge portions of the collector subassembly 54. The composite strip 102 includes the bendable, formable tape 52 and the beads 94 of moisture-impervious adhesive adjacent the edges thereof and is mounted on the solar collector subassembly 54 with the adhesive beads 94 on the outer marginal edges of the solar subassembly 54.

In this embodiment the volatile moving into the airspace is minimized by using reduced amounts of adhesive and by condensing the volatiles in the adhesive on the tape 52. More particularly, the volatiles in the adhesive layer on the outer marginal edge portions of the adhesive is heated to a higher temperature than the adhesive layer on the outer marginal edge portions of the outer cover plate 16. This provides a temperature gradient in the tape 52 having the hotter side near the absorber plate. The volatiles in the adhesive move from the absorber plate and condense on the tape 52 adjacent the cover plate 16.

The thermal-insulating compartment 60 and channel member 70 are applied to the solar subassembly 54 as previously discussed.

As can now be appreciated, the invention is not limited to any particular method or construction of a solar heat collector and the solar heat collectors constructed are merely illustrative of those that may be used to practice the invention.

DETAILED DESCRIPTION OF THE INVENTION

The invention will now be described to construct a solar heat collector in accordance with the teachings of the invention.

With reference to FIGS. 2 and 3, a pair of spacer frames 18 of the type disclosed in the above-mentioned U.S. Pat. application Ser. No. 550,680 are provided. The spacer frame includes four sections 24, 26, 30 and 32 of lock seam spacer having a desiccant 22 therein such as molecular sieve or silica gel therein. The ends of the sections are mitered and joined together. The sections 24 and 26 have passageways 28 which provide communication between airspaces 20 and the desiccant material therein. The passageways of the sections 30 and 32 are sealed as by a layer of paint 34 as taught in the above-mentioned U.S. Pat. application Ser. No. 550,680. The spacer frames have dimensions of about 7 feet (2.1 meters) × 3 feet (0.9 meter) × ½ inch (1.25 centimeters). A capillary tube 36 is provided adjacent joined ends of spacer sections 30 and 32.

The spacer frame 20 is heated to a temperature of 400° F. (204° C.) for about 2 hours in any conventional manner to drive off essentially all moisture in the desiccant material 22 of the spacer frame through the tube 36 and the passageways 28.

A pair of commercial soda-lime-glass sheets having dimensions of 7 feet (2.1 meters) × 3 feet (0.9 meter) × ⅛ inch (0.32 centimeter) are provided. The glass sheets are preferably tempered so as to reduce the probability of breakage during use, e.g., from stones or hail. The glass sheets are cleaned in any conventional manner to remove any foreign particles that may inhibit the passage of solar energy through the glass sheet toward absorber plate 12.

The absorber plate 12 is provided with a conduit 42 having one end connected to an inlet pipe 44 and the other end connected to an outlet pipe 46 (see FIG. 1) for moving a heat absorbing medium therethrough, e.g., water, or a mixture of water and ethylene glycol. The absorber plate has dimensions of 7 feet (2.1 meters) × 3 feet (0.9 meter).

Surface 40 of the absorber plate facing the sun is provided with a layer of black paint such as the type sold by PPG Industries, Incorporated under the trademark DURACRON Super 600L/G and fired at a temperature of 350° F. (177° C.) for 15 to 20 minutes to provide the absorber plate with a surface having an absorptivity coefficient for solar radiation in a wavelength of 0.3 to 2.1 microns and an emissivity coefficient for infrared energy in the wavelength of 2 to 20 microns of about 0.95.

The absorber plate 12 is advantageously positioned on a rigid surface with the surface 40 facing upward. A spacer frame 18 is positioned on the absorber with marginal edges aligned. The intermediate glass sheet 14 is positioned on top of the spacer frame in the same manner. Thereafter, in like manner, the other spacer frame 18 is positioned on the intermediate glass sheet 14 followed by the outer glass sheet 16 to provide a solar heat collector subassembly 54.

A composite strip 50 having (1) a 1¾ inch (4.4 centimeters) wide aluminum tape 52 having a thickness of 0.005 inch (0.15 centimeter); (2) a 1⅝ inch (4.2 centimeters) wide layer 58 of moisture-impervious adhesive having a thickness of 0.035 inch (0.09 centimeter) on one surface of the tape 52 and (3) a 1 inch (2.54 centimeters) wide aluminum tape 56 having a thickness of 0.004 inch (0.01 centimeter) on the layer 58 of adhesive as shown in FIG. 4 is provided. The composite strip 50 has a length of about 20.5 feet (6 meters). The composite strip is applied in any conventional manner with the tape 56 around the peripheral edges of the collector subassembly 54 and the adhesive layer 58 on each side of the tape 56 on the outer marginal edge portions of the collector subassembly 54, i.e., the outer marginal edge portions of the glass sheet 16 and absorber plate 12. Moisture-impervious adhesive is provided at the overlap of the composite strip 50 to prevent the ingress of moisture into the compartment 20.

The capillary tube 36 of the spacer frames 18 extend beyond the strip 50 and moisture-resistant adhesive is provided about the tubes 36 and the aluminum tape 52. Thereafter the tubes are bent toward the aluminum tape 52 and covered with a piece of aluminum to prevent particles of dirt and dust from clogging the tubes.

A pan-shaped membmer 64 having a base 104, sidewalls 106 and flanges 68 made of galvanized steel 1/16 inch (0.16 centimeter) thick is provided. The inside dimensions of the base 104 are approximately 6 feet 10½ inches (2.09 meters) × 2 feet 10½ inches (0.89 meter). The height of the sidewalls 106 is approximately 3inches (7.6 centimeters). The flanges 68 extend outward from the sidewalls 106 about 1½ inches (1.27 centimeters). A ⅛ inch (0.32 centimeter) thick asbestos tape 66 is provided on the flanges 68 of the pan-shaped member 64. A layer of fiber glass 62 having a thickness of about 3 inches (7.6 centimeters) is provided in the pan-shaped member 64 and positioned against the outer surface of the absorber plate 12. The pan-shaped member 64 is held against the outer surface of the absorber plate 12 by a U-shaped channel member 70 as shown in FIG. 2.

The channel member 70 is made of steel U-shaped channel sections about 0.017 inch (0.043 centimeter) thick. Legs 72 and 74 of the channel member 70 are about ⅜ inch (0.95 centimeter) high and the central portion 108 is about 1¼ inches (3.2 centimeters) wide. The legs 72 and 74 and central portion 108 form an angle slightly less than 90°. The legs 72 and 74 are held apart to permit insertion of the collector and flanges of the pan-shaped member 64 and are then released to spring back to contact marginal edge portions of the outer glass sheet 12 and flanges 68 of the pan-shaped member 64.

As can now be appreciated, during use the absorber 12 absorbs solar radiation to heat the heat absorbing medium, the air in the airspace is heated and heats the spacer frame and composite tape 50 by convection and/or conduction. Because the vapor barrier tape 56 separates the adhesive layers 58 from the periphery of the solar composite there will be little, if any, migration of volatiles from the adhesive into the airspaces 20 to condense on the glass sheets. By reducing or eliminating the condensation of volatiles on the glass sheets, the efficiency of the solar heat collector will be enhanced.

Referring now to FIGS. 5 and 6, the discussion will be directed to the construction of solar heat collector 80. The glass sheets 14 and 16, spacer frame 18 and absorber plate 12 are provided as previously discussed.

The absorber 12 is positioned on a rigid surface with the surface 40 facing upward. A one-eighth inch (0.32 centimeter) thick and one-half inch (1.25 centimeters) wide asbestos tape 86 is positioned on the absorber with marginal edges aligned. The spacer frame 18 is positioned on the asbestos tape 86 with marginal edges aligned. Thereafter the intermediate glass sheet, spacer frame and outer glass sheet are stacked on the spacer frame as previously discussed to provide a solar collector subassembly 88.

A composite strip 90 includes the aluminum tape 56 centered on the aluminum tape 52 and held in position by beads 94 of the moisture-impervious adhesive. The beads 94 of the adhesive have a width of five-sixteenths inch (0.8 centimeter) and a thickness of 0.035 inch (0.09 centimeter). The composite strip 90 is applied to the solar collector subassembly 88 in any conventional manner with the vapor barrier tape 56 around the peripheral edges of the collector subassembly and the adhesive beads on the outer marginal edge of the collector subassembly. Moisture-impervious adhesive is provided at the overlap of the composite strip 90 to prevent the ingress of moisture into the compartments 20 and 84.

The tube 36 of the spacer frames is bent and the thermo-insulating compartment 60 and channel member 70 are applied to the solar collector as previously discussed.

Referring to FIGS. 7 and 8, the discussion will now be directed to the construction of solar heat collector 100 incorporating features of the invention.

The solar collector subassembly 54 shown in FIG. 1 is provided as previously discussed.

A composite strip 102 including the aluminum tape 52 having the beads 94 of the moisture-adhesive adjacent the edges thereof is provided. The composite strip 102 is applied in any conventional manner to the solar heat collector subassembly 54 with the adhesive on the outer marginal edges of the collector subassembly.

The tube 36 of the spacer frames is bent and the thermal insulating compartment 60 and channel member 70 are applied as previously discussed.

As can be appreciated, the invention is not limited to any particular solar collector construction and method of making same and the examples are merely illustrative of those that may be used. For example, the tape 56 of FIGS. 4 may be applied to the peripheral portions of the subassemblies 54 and 88 (FIGS. 2 and 5, respectively) and thereafter the tape 52 and adhesive are applied over the subassemblies having the vapor-impervious barrier tape 56.

What is claimed is:

1. In a method of fabricating a solar heat collector wherein the method comprises the steps of providing a solar energy and infrared absorber plate, and a cover plate capable of passing solar energy, and mounting the absorber plate and cover plate in spaced relation to provide a solar heat collector subassembly having an airspace between the cover plate and the absorber, the improvement comprising:
   providing a vapor-impervious barrier adjacent and substantially around the peripheral edge of the heat collector subassembly to prevent volatiles from moving into the airspace; and
   providing a moisture-impervious seal including a moisture-impervious adhesive having volatiles therein about the vapor-impervious barrier and in sealing contact with the heat collector subassembly to prevent moisture from moving into the airspace.

2. The improved method as set forth in claim 1 further including mounting a second cover plate in spaced relation to the first cover plate to provide an airspace between the cover plates.

3. The improved method as set forth in claim 2 wherein said mounting steps are accomplished by:
   providing a pair of spacer frames each having a desiccant material therein and a continuous portion having means for providing communication with the airspace and the desiccant material and having means for providing communication with ambient air and the airspace by way of the desiccant material; and
   positioning one of the spacer frames between the absorber and first cover plate and the other one of the spacer frames between the first cover plate and second cover plate.

4. The improved method as set forth in claim 3 wherein said providing steps include the steps of:
   providing a composite strip having a bendable, flexible, moisture-impervious tape adhered to a bendable, flexible, vapor-impervious tape by a layer of the moisture-impervious adhesive wherein the width of the vapor-impervious tape is equal to or less than the width of the layer of the moisture-impervious adhesive; and
   applying the composite strip to the collector subassembly with the vapor-impervious tape adjacent the peripheral edge of the subassembly and the adhesive in sealing contact with the outer marginal edges of the subassembly.

5. The improved method as set forth in claim 3 wherein said providing steps include the steps of:
   providing a composite strip having a bendable, formable, moisture-impervious tape having a bead of the moisture-impervious adhesive on one side of the tape adjacent an edge and a second bead of the adhesive adjacent the opposite edge spaced from the first bead of adhesive to provide an intermediate tape portion; and
   applying the composite strip to the collector subassembly with the intermediate tape portion adjacent the peripheral edge of the subassembly and the first bead of adhesive in sealing contact with the outer marginal edges of the second cover plate and the second bead of adhesive in sealing contact with the outer marginal edges of the absorber plate.

6. The improved method as set forth in claim 3 wherein said providing steps include the steps of:
   providing a composite strip of a moisture-impervious, vapor-impervious, bendable, formable tape having a groove in opposed sides and the moisture-impervious adhesive in the grooves to provide an intermediate tape portion; and
   applying the intermediate tape portion against the peripheral edge of the collector subassembly and the adhesive in sealing contact with the outer marginal edges of the subassembly.

7. The improved method as set forth in claim 6 wherein said tape includes a first tape of a bendable, formable, moisture-impervious material and a second tape of a bendable, formable, vapor-impervious material.

8. The improved method as set forth in claim 1 further including the step of:
   mounting a thermal-insulating compartment on the outer surface of the absorber plate.

9. The improved method as set forth in claim 1 wherein said providing steps include the steps of:
   providing a composite strip having a bendable, flexible, moisture-impervious tape adhered to a bendable, flexible, vapor-impervious tape by a layer of the moisture-impervious adhesive wherein the width of the vapor-impervious tape is equal to or less than the width of the layer of the moisture-impervious adhesive; and
   applying the composite strip to the collector subassembly with the vapor-impervious tape adjacent the peripheral edge of the subassembly and the adhesive in sealing contact with the outer marginal edges of the subassembly.

10. The improved method as set forth in claim 1 wherein said providing steps include the steps of:
    providing a composite strip having a bendable, formable, moisture-impervious tape having a bead of the moisture-impervious adhesive on one side of the tape adjacent an edge and a second bead of the adhesive adjacent the opposite edge spaced from the first bead of adhesive to provide an intermediate tape portion; and
    applying the composite strip to the collector subassembly with the intermediate tape portion adjacent the peripheral edge of the subassembly and the first bead of adhesive in sealing contact with the outer marginal edges of the cover plate and the second bead of adhesive in sealing contact with the outer marginal edges of the absorber plate.

11. The improved method as set forth in claim 1 wherein said providing steps include the steps of:
    providing a composite strip of a moisture-impervious, vapor-impervious, bendable, formable tape having a groove in opposed sides and the moisture-impervious adhesive in the grooves to provide an intermediate tape portion; and
    applying the intermediate tape portion against the peripheral edge of the collector subassembly and the adhesive in sealing contact with the outer marginal edges of the subassembly.

12. The improved method as set forth in claim 11 wherein said tape includes a first tape of a bendable, formable, moisture-impervious material and a second tape of a bendable, formable, vapor-impervious material.

13. An improved solar heat collector of the type having a cover plate capable of passing solar energy; a solar energy and infrared absorber plate; and means for maintaining the cover plate and absorber in spaced relation to provide an airspace therebetween, the cover plate, absorber and maintaining means forming a solar collector subassembly, the improvement comprising:

vapor-impervious barrier adjacent and substantially around the peripheral edge of the collector subassembly to prevent volatiles from moving into the airspace; and a moisture-impervious seal including a moisture-impervious adhesive having volatiles therein positioned over said vapor-impervious barrier and in sealing contact with the subassembly to prevent moisture from moving into the airspace.

14. The improved solar collector as set forth in claim 13 further including a thermal-insulating compartment mounting the outer surface of the absorber plate.

15. The improved solar collector as set forth in claim 13 wherein the absorber includes means for moving a heat absorbing medium through the absorber plate.

16. The improved solar collector as set forth in claim 13 further including means for equalizing the air pressure in the compartment to ambient air pressure while preventing the movement of moisture into the airspace.

17. The improved solar heat collector as set forth in claim 13 wherein said moisture-impervious seal includes a bendable, flexible, moisture-impervious tape having a layer of said moisture-impervious adhesive thereon and said vapor-impervious barrier includes a bendable, flexible, vapor-impervious tape mounted on said adhesive layer, said vapor-impervious tape having a width equal to or less than the width of said adhesive layer and said vapor-impervious tape mounted adjacent the peripheral edge of the collector subassembly with the adhesive in sealing contact with the outer marginal edges of the collector subassembly.

18. The improved solar collector as set forth in claim 17 wherein the bendable, flexible, moisture-impervious tape is made of a metal.

19. The improved solar collector as set forth in claim 17 wherein the bendable, flexible, vapor-impervious tape is made of a metal.

20. The improved solar collector as set forth in claim 17 wherein the bendable, flexible, vapor-impervious tape is made of synthetic resin polymers.

21. The improved solar heat collector as set forth in claim 13 wherein said moisture-impervious seal and said vapor-impervious barrier includes a bendable, formable, moisture-impervious and vapor-impervious tape having a groove at opposed sides and said moisture-impervious adhesive in the grooves to provide an intermediate tape portion, said intermediate tape portion mounting the peripheral edge of the collector subassembly with said adhesive in sealing contact with the outer marginal edges of the collector subassembly.

22. The improved solar heat collector as set forth in claim 21 wherein said bendable, formable, moisture-impervious, vapor-impervious tape includes a moisture-impervious tape and a vapor-impervious tape, said vapor-impervious tape having a width less than the width of the moisture-impervious tape.

23. The improved solar heat collector as set forth in claim 13 wherein said vapor-impervious barrier is a bendable, flexible, moisture and vapor-impervious tape and said moisture-impervious seal is a first bead of said moisture-impervious adhesive adjacent one side of the tape and a second bead of said moisture-impervious adhesive adjacent the other side of the tape spaced from the first bead to provide an intermediate tape portion, said tape mounting the subassembly with the intermediate tape portion adjacent the peripheral edge of the subassembly and the first bead of said adhesive in sealing contact with the marginal edges of the cover plate and the second bead in sealing contact with the marginal edges of the absorber plate.

24. The improved solar collector as set forth in claim 13 wherein the cover plate is a glass sheet.

25. A solar heat collector comprising:

a solar energy and infrared absorber having means for passing a heat absorbing medium therethrough;

a first tempered glass sheet;

a second tempered glass sheet;

a moisture-impervious seal including a moisture-impervious adhesive having volatiles therein positioned over said vapor-impervious barrier and in sealing contact with said subassembly to prevent moisture from moving into the airspace.

26. The solar collector as set forth in claim 25 further including a layer of thermal-insulating material between said second spacer frame and said absorber.

27. The solar collector as set forth in claim 25 further including a thermal-insulating material on the outer surface of said absorber plate.

28. The improved solar heat collector as set forth in claim 25 wherein said moisture-impervious seal includes a bendable, flexible, moisture-impervious tape having a layer of said moisture-impervious adhesive thereon and said vapor-impervious barrier includes a bendable, flexible, vapor-impervious tape mounted on said adhesive layer, said vapor-impervious tape having a width equal to or less than the width of said adhesive layer, said vapor-impervious tape mounted adjacent the peripheral edge of the collector subassembly with said adhesive in sealing contact with the outer marginal edges of the collector subassembly.

29. The improved solar heat collector as set forth in claim 25 wherein said moisture-impervious seal and said vapor-impervious barrier includes a bendable, formable, moisture-impervious and vapor-impervious tape having a groove at opposed sides and said moisture-impervious adhesive in the grooves to provide an intermediate tape portion, said intermediate tape portion mounting the peripheral edge of the collector subassembly with said adhesive in sealing contact with the outer marginal edges of the collector subassembly.

30. The improved solar heat collector as set forth in claim 29 wherein said bendable, formable, moisture-impervious, vapor-impervious tape includes a moisture-impervious tape and a vapor-impervious tape, said vapor-impervious tape having a width less than the width of the moisture-impervious tape.

31. The improved solar heat collector as set forth in claim 25 wherein said vapor-impervious barrier is a bendable, flexible, moisture and vapor-impervious tape and said moisture-impervious seal is a first bead of said moisture-impervious adhesive adjacent one side of the tape and a second bead of said moisture-impervious adhesive adjacent the other side of the tape spaced from the first bead to provide an intermediate tape portion, said tape mounting the subassembly with the intermediate tape portion adjacent the peripheral edge of the subassembly and the first bead of said adhesive in sealing contact with the marginal edges of the second sheet and the second bead in sealing contact with the marginal edges of the absorber.

* * * * *

UNITED STATES PATENT AND TRADEMARK OFFICE
CERTIFICATE OF CORRECTION

PATENT NO. : 3,990,431

DATED : November 9, 1976

INVENTOR(S) : RENATO J. MAZZONI & LESTER F. SCHUTRUM

It is certified that error appears in the above-identified patent and that said Letters Patent are hereby corrected as shown below:

Claim 25, column 12, line 5, after "a second tempered glass sheet;" insert

--a first spacer frame mounted between said absorber and said first sheet of glass to provide an airspace therebetween;

a second spacer frame mounted between said first and second glass sheets to provide an airspace therebetween;

said first and second spacer frames each comprising:

hollow metal sections joined together to form a spacer frame;

desiccant material within the spacer frame;

means for providing communication between the airspace and the desiccant material; and means for equalizing air pressure in the airspace to ambient air pressure while preventing moisture from moving into the airspace;

UNITED STATES PATENT AND TRADEMARK OFFICE
CERTIFICATE OF CORRECTION

PATENT NO. : 3,990,431

DATED : November 9, 1976

INVENTOR(S) : RENATO J. MAZZONI & LESTER F. SCHUTRUM

Page 2 of 2

It is certified that error appears in the above—identified patent and that said Letters Patent are hereby corrected as shown below:

(CONT.)

said spacer frames, said cover plates and said absorber forming a collector subassembly;

a vapor-impervious barrier adjacent the peripheral edge of said subassembly to prevent volatiles from moving into the airspaces; and—

Signed and Sealed this

Eighth Day of February 1977

[SEAL]

Attest:

RUTH C. MASON
*Attesting Officer*

C. MARSHALL DANN
*Commissioner of Patents and Trademarks*